United States Patent
Sercel et al.

(10) Patent No.: US 11,819,949 B2
(45) Date of Patent: *Nov. 21, 2023

(54) MULTI-LASER SYSTEM AND METHOD FOR CUTTING AND POST-CUT PROCESSING HARD DIELECTRIC MATERIALS

(71) Applicant: IPG Photonics Corporation, Oxford, MA (US)

(72) Inventors: Jeffrey P. Sercel, Hollis, NH (US); Marco Mendes, Manchester, NH (US); Rouzbeh Sarrafi, Fremont, NH (US); Joshua Schoenly, Nashua, NH (US); Xiangyang Song, Acton, MA (US); Mathew Hannon, Bedford, NH (US); Miroslaw Sokol, Bedford, NH (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 492 days.

This patent is subject to a terminal disclaimer.

(21) Appl. No.: 17/074,489

(22) Filed: Oct. 19, 2020

(65) Prior Publication Data

US 2021/0094127 A1   Apr. 1, 2021

Related U.S. Application Data

(60) Continuation of application No. 15/708,628, filed on Sep. 19, 2017, now Pat. No. 10,807,199, which is a
(Continued)

(51) Int. Cl.
*B23K 26/40* (2014.01)
*B23K 26/06* (2014.01)
(Continued)

(52) U.S. Cl.
CPC ........ *B23K 26/402* (2013.01); *B23K 26/0613* (2013.01); *B23K 26/0624* (2015.10);
(Continued)

(58) Field of Classification Search
None
See application file for complete search history.

(56) References Cited

U.S. PATENT DOCUMENTS

| 3,860,784 A | 1/1975 | Brown et al. |
| 4,248,369 A | 2/1981 | Clausen |

(Continued)

FOREIGN PATENT DOCUMENTS

| CN | 103949779 A | 7/2014 |
| JP | S56169347 | 12/1981 |

(Continued)

OTHER PUBLICATIONS

PCT International Search Report and Written Opinion dated Nov. 24, 2015, received in corresponding PCT Application No. PCT/US15/047456, 11 pgs.
(Continued)

*Primary Examiner* — Geoffrey S Evans
(74) *Attorney, Agent, or Firm* — Grossman, Tucker, Perreault & Pfleger, PLLC

(57) ABSTRACT

Laser processing of hard dielectric materials may include cutting a part from a hard dielectric material using a continuous wave laser operating in a quasi-continuous wave (QCW) mode to emit consecutive laser light pulses in a wavelength range of about 1060 nm to 1070 nm. Cutting using a QCW laser may be performed with a lower duty cycle (e.g., between about 1% and 15%) and in an inert gas atmosphere such as nitrogen, argon or helium. Laser processing of hard dielectric materials may further include post-cut processing the cut edges of the part cut from the dielectric material, for example, by beveling and/or polishing the edges to reduce edge defects. The post-cut processing may be performed using a laser beam with different laser parameters than the beam used for cutting, for example, by
(Continued)

using a shorter wavelength (e.g., 193 nm excimer laser) and/or a shorter pulse width (e.g., picosecond laser).

20 Claims, 10 Drawing Sheets

Related U.S. Application Data division of application No. 14/838,809, filed on Aug. 28, 2015, now Pat. No. 9,764,427.

(60) Provisional application No. 62/043,363, filed on Aug. 28, 2014.

(51) Int. Cl.
| | |
|---|---|
| B23K 26/08 | (2014.01) |
| B23K 26/402 | (2014.01) |
| B23K 26/38 | (2014.01) |
| B23K 26/0622 | (2014.01) |
| B23K 26/361 | (2014.01) |
| B23K 26/082 | (2014.01) |
| B23K 26/70 | (2014.01) |
| C03B 33/02 | (2006.01) |
| B23K 103/00 | (2006.01) |

(52) U.S. Cl.
CPC ........ *B23K 26/082* (2015.10); *B23K 26/0853* (2013.01); *B23K 26/0876* (2013.01); *B23K 26/361* (2015.10); *B23K 26/38* (2013.01); *B23K 26/70* (2015.10); *C03B 33/0222* (2013.01); *B23K 2103/50* (2018.08); *B23K 2103/52* (2018.08); *B23K 2103/54* (2018.08); *Y02P 40/57* (2015.11)

(56) References Cited

U.S. PATENT DOCUMENTS

| | | | |
|---|---|---|---|
| 4,338,114 | A | 7/1982 | Brockway et al. |
| 5,697,998 | A | 12/1997 | Platus et al. |
| 5,916,460 | A | 6/1999 | Imoto et al. |
| 6,376,797 | B1 | 4/2002 | Piwczyk et al. |
| 6,705,125 | B2 | 3/2004 | Peterson et al. |
| 6,841,482 | B2 | 1/2005 | Boyle |
| 7,425,471 | B2 | 9/2008 | Bruland et al. |
| 7,592,563 | B2 | 9/2009 | Wissenbach et al. |
| 7,994,450 | B2 | 8/2011 | Haight et al. |
| 8,116,341 | B2 | 2/2012 | Lei et al. |
| 8,652,658 | B2 | 2/2014 | Tatartchenko et al. |
| 9,764,427 | B2 * | 9/2017 | Sercel ............... B23K 26/38 |
| 10,807,199 | B2 * | 10/2020 | Sercel ............... B23K 26/0613 |
| 2001/0009250 | A1 | 7/2001 | Herman et al. |
| 2001/0020548 | A1 | 9/2001 | Burgess |
| 2001/0035401 | A1 | 11/2001 | Manor |
| 2002/0056891 | A1 | 5/2002 | Wu |
| 2005/0279740 | A1 | 12/2005 | Liu et al. |
| 2006/0114948 | A1 | 6/2006 | Lo et al. |
| 2007/0062917 | A1 | 3/2007 | Fu et al. |
| 2007/0104243 | A1 | 5/2007 | Chen |
| 2007/0228100 | A1 | 10/2007 | Gonoe |
| 2007/0272668 | A1 | 11/2007 | Albelo et al. |
| 2009/0045179 | A1 * | 2/2009 | Williams ............ B23K 26/364 219/121.72 |
| 2010/0177794 | A1 | 7/2010 | Peng et al. |
| 2010/0240159 | A1 * | 9/2010 | Kumagai ............ B23K 26/53 438/33 |
| 2011/0085574 | A1 | 4/2011 | Osako et al. |
| 2011/0132885 | A1 | 6/2011 | Sercel et al. |
| 2011/0139759 | A1 | 6/2011 | Millman, Jr. et al. |
| 2011/0170172 | A1 | 7/2011 | Mizushima et al. |
| 2012/0061356 | A1 | 3/2012 | Fukumitsu |
| 2012/0077296 | A1 | 3/2012 | Yamada et al. |
| 2012/0255935 | A1 | 10/2012 | Kakui et al. |
| 2013/0126573 | A1 | 5/2013 | Hosseini et al. |
| 2013/0134139 | A1 | 5/2013 | Duerr et al. |
| 2013/0153554 | A1 | 6/2013 | Duerr et al. |
| 2013/0215914 | A1 | 8/2013 | Imai et al. |
| 2014/0030443 | A1 | 1/2014 | Prest et al. |
| 2014/0076299 | A1 | 3/2014 | Richter et al. |
| 2014/0227889 | A1 * | 8/2014 | Shah ................ B23K 26/40 219/121.72 |
| 2016/0001398 | A1 | 1/2016 | Kancharla et al. |

FOREIGN PATENT DOCUMENTS

| | | |
|---|---|---|
| JP | 5639046 | 12/2014 |
| WO | 2010123068 A1 | 10/2010 |
| WO | 2014012125 A1 | 1/2014 |

OTHER PUBLICATIONS

PCT International Search Report and Written Opinion dated Jun. 10, 2014, received in related PCT Application No. PCT/US14/19460, 13 pgs.
QCW Fiber Laser 2012 Series, Datasheet [online], IPG, Jan. 2012, https://web.archive.org/web/20120314232840/http://www.ipgphontonics.com/Collateral/Documents/English-US/QuasiCW_SM_IPG.pdf., 2 pgs.
PCT International Search Report and Written Opinion dated Jun. 8, 2015, received in related PCT Application No. PCT/US15/18038, 12 pgs.
PCT International Search Report and Written Opinion dated Nov. 27, 2015, received in related PCT Application No. PCT/US15/47485, 11 pgs.
U.S. Office action dated Oct. 4, 2017, received in U.S. Appl. No. 14/838,837, 22 pgs.
Taiwanese Office Action with English language summary, dated Nov. 16, 2017, received in TW Application No. 103106983, 11 pgs.
Office Action dated Jun. 4, 2018 received in related U.S. Appl. No. 14/770,565, 16 pages.
European Examination Report dated May 4, 2018 in related European Application No. 14757006.3, 6 pgs.
U.S. Notice of Allowance dated May 19, 2017, received in related U.S. Appl. No. 14/838,809, 6 pgs.
U.S. Office Action dated Feb. 8, 2017, received in related U.S. Appl. No. 14/838,809, 10 pgs.

* cited by examiner

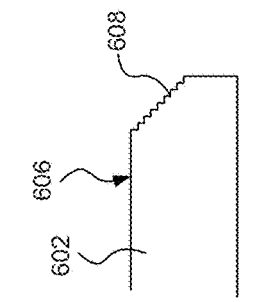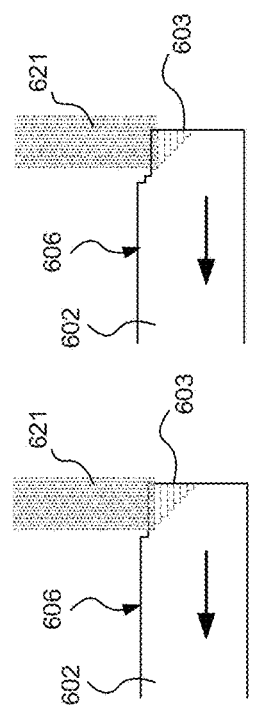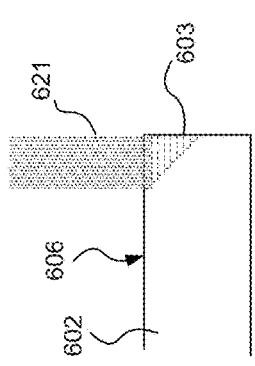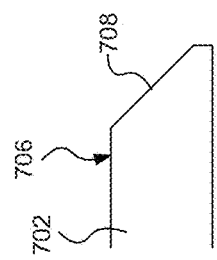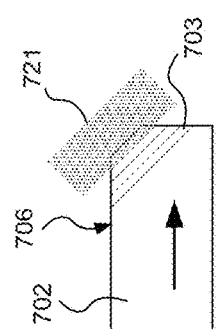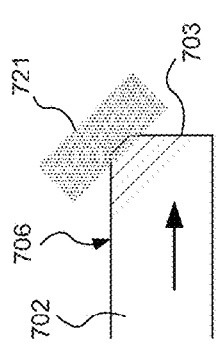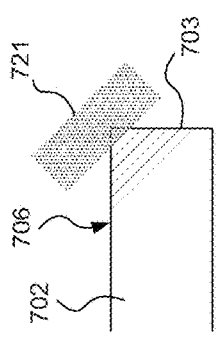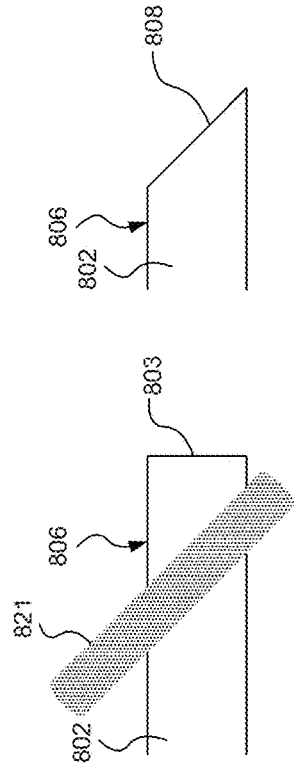

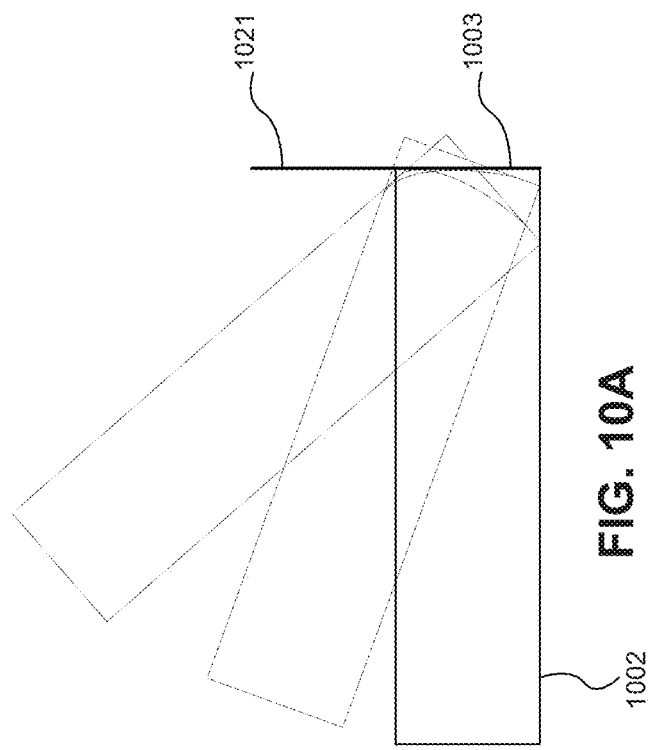
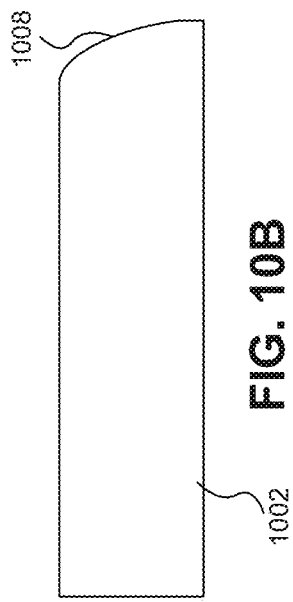

MULTI-LASER SYSTEM AND METHOD FOR CUTTING AND POST-CUT PROCESSING HARD DIELECTRIC MATERIALS

CROSS-REFERENCE TO RELATED APPLICATIONS

The present application is a continuation application of U.S. patent application Ser. No. 15/708,628 filed Sep. 19, 2017, now U.S. Publication No. 2018-0001425 dated Jan. 4, 2018, which is a divisional of co-pending U.S. patent application Ser. No. 14/838,809 filed Aug. 28, 2015, now U.S. Pat. No. 9,764,428 issued Sep. 19, 2017, which claims the benefit of U.S. Provisional Patent Application Ser. No. 62/043,363 filed Aug. 28, 2014, which is fully incorporated herein by reference. The present application is related to International Application No. PCT/US14/19460 filed Feb. 28, 2014 entitled LASER SYSTEM AND METHOD OF USING SAME FOR PROCESSING SAPPHIRE and U.S. Provisional Patent Application Ser. No. 61/945,911 filed Feb. 28, 2014 entitled MULTIPLE-BEAM LASER PROCESSING USING MULTIPLE LASER BEAMS WITH DISTINCT WAVELENGTHS AND/OR PULSE DURATIONS, both of which are fully incorporated herein by reference.

BACKGROUND OF THE DISCLOSURE

Field of the Disclosure

The present disclosure relates to processing hard dielectric materials using lasers, and more particularly, relates to a multi-laser system and method for cutting and post-cut processing hard dielectric materials such as ceramics.

Background Art Discussion

Hard dielectric materials, such as sapphire ($Al_2O_3$), toughened glass (e.g., GORILLA® glass), and other ceramics, may be used for many industrial applications such as optical windows, hard materials preventing abrasion, and buffer materials for a semiconductor emitting device, and the like. Conventional mechanical methods for treating or processing sapphire and other such materials include diamond scribing and blade dicing; however, these methods often lead to breaking the substrate, which lowers production yields.

Laser processing methods have been used in an effort to increase efficiency because they provide a noncontact process that is more efficient for high volume production. The laser scribed cutting depth may also be controlled to reduce stress on the wafer during the break process, and laser scribing facilitates precise positioning of scribes. Thus, laser processing has overall advantages of increased throughput, low cost, ease of use, and high yields compared to traditional mechanical methods.

Certain materials, however, present challenges when processing using lasers. The bandgap of sapphire, for example, is approximately 8 eV, and under normal low intensity illumination, sapphire is optically transparent from 5000 nm to about 300 nm. Therefore, conventional laser processing of sapphire has used lasers that are more likely to be absorbed in sapphire, such as DUV and UV lasers operating in a wavelength range between about 157 and about 355 nm.

Laser processing of sapphire has also been performed using ultrafast lasers (e.g., picosecond and shorter pulse widths) and/or Q-switched pulse lasers with nanosecond pulse widths. Such lasers may be used to emit pulses with high peak power capable of ablating sapphire. Picosecond lasers may also be used to focus inside a sapphire substrate forming cracks within the substrate without affecting the top and bottom surfaces. The cut parts may then be mechanically separated from the substrate after the cracks are formed.

The existing techniques used for laser processing of sapphire discussed above also suffer from other drawbacks. In particular, the cost of pulsed lasers is high and the multi-step process of forming cracks and separating parts is time consuming and cost inefficient. Also, the wavelengths used in UV cutting require the use of crystals, which may have a short useful life and may present issues with the maintenance of these lasers.

Cutting hard dielectric materials also presents challenges because of the defects and imperfections that might form in the material after cutting. Hard dielectric materials including crystalline and amorphous ceramics have a tendency to fail in tension before they fail in compression. Stress concentrations at the cut edges, for example, may lead to crack propagation throughout the material. These materials may be more susceptible to these defects and imperfections when certain types of lasers are used to perform the cutting. Sometimes the lasers that perform the cutting most efficiently (e.g., at a lower cost and higher speeds) may cause edge defects such as chipping, cracking, and induced stress concentrations proximate the cut edges.

Accordingly, a need exists for a system and method of efficiently laser cutting hard dielectric materials at increased speeds in a time-effective and a cost-effective manner while also reducing edge defects.

SUMMARY OF THE DISCLOSURE

Consistent with an embodiment, a method is provided for laser cutting and post-cut processing a part from a hard dielectric material. The method includes: cutting at least one part from a hard dielectric material using at least a first laser beam, wherein the first laser beam is emitted from a continuous wave laser operating in a quasi-continuous wave ("QCW") mode so as to emit consecutive pulses of laser light at a wavelength ranging between about 1060 nm and about 1070 nm; and post-cut processing cut edges of the at least one part using at least a second laser beam to bevel and/or polish the cut edges of the at least one part such that edge defects are reduced.

Consistent with another embodiment, a multi-laser system includes a first laser system for cutting at least one part from a hard dielectric material using at least a first laser beam and a second laser system for post-cut processing cut edges of the at least one part using at least a second laser beam to bevel and/or polish the cut edges of the at least one part such that edge defects are reduced. The first laser system includes a continuous wave laser operating in a quasi-continuous wave ("QCW") mode so as to emit consecutive pulses of laser light at a wavelength ranging between about 1060 nm and about 1070 nm. The multi-laser system also includes at least one motion stage for supporting the hard dielectric material and the cut part and for moving the hard dielectric material and the cut part relative to the first laser system and the second laser system, respectively. The multi-laser system further includes a control system configured to control the first laser system, the second laser system and the at least one motion stage.

BRIEF DESCRIPTION OF THE DRAWINGS

These and other features and advantages will be better understood by reading the following detailed description, taken together with the drawings wherein:

FIGS. 6A-6D illustrate a method for beveling a cut edge of a part cut from a hard dielectric material by laser milling with a perpendicular laser beam, consistent with an embodiment of the present disclosure.

FIGS. 7A-7D illustrate a method for beveling a cut edge of a part cut from a hard dielectric material by laser milling with an angled laser beam, consistent with another embodiment of the present disclosure.

FIGS. 8A and 8B illustrate a method for beveling a cut edge of a part cut from a hard dielectric material by laser cutting, consistent with a further embodiment of the present disclosure.

FIGS. 10A and 10B illustrate another method for beveling an edge of a part by moving the part away from a horizontal axis relative to the beam to continuously change the angle of the angled beam to produce a rounded bevel, consistent with another embodiment of the present disclosure.

DETAILED DESCRIPTION

Figure 1:
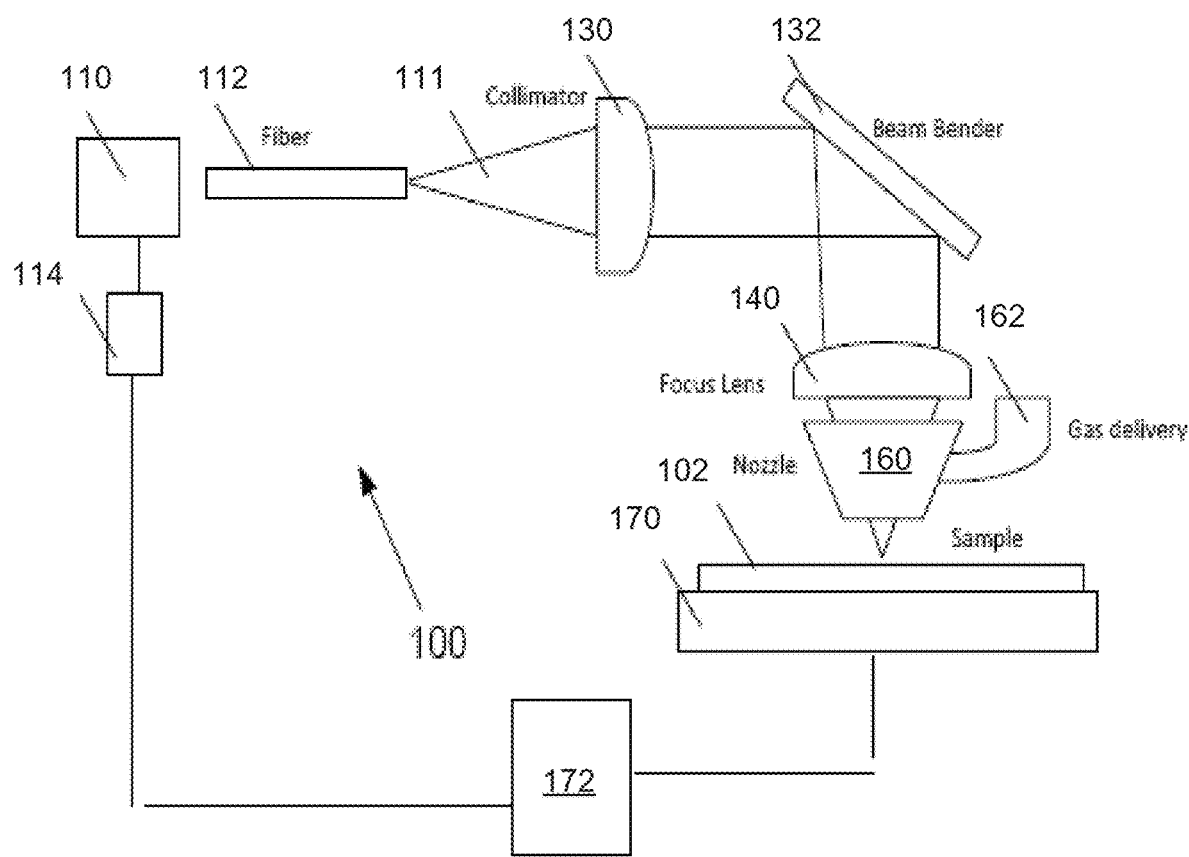
FIG. 1 is a schematic diagram of a laser processing system for cutting a hard dielectric material using a quasi-continuous wave (QCW) laser system, consistent with an embodiment of the present disclosure.

Laser processing of hard dielectric materials, consistent with embodiments of the present disclosure, may include cutting a part from a hard dielectric material using a continuous wave laser operating in a quasi-continuous wave (QCW) mode to emit consecutive laser light pulses in a wavelength range of about 1060 nm to 1070 nm (hereinafter "QCW laser"). Cutting using a QCW laser may be performed with a lower duty cycle (e.g., between about 1% and 15%) and in an inert gas atmosphere such as nitrogen, argon or helium. Laser processing of hard dielectric materials may further include post-cut processing the cut edges of the part cut from the dielectric material, for example, by beveling and/or polishing the edges to reduce edge defects. The post-cut processing may be performed using a laser beam with different laser parameters than the beam used for cutting, for example, by using a shorter wavelength (e.g., 193 nm excimer laser) and/or a shorter pulse width (e.g., a picosecond laser).

As used herein, "hard dielectric materials" refers to dielectric materials including ceramics having a hardness greater than 5 on the Mohs scale. Examples of hard dielectric materials include, without limitation, sapphire and GORILLA® glass. Sapphire is a single crystal form of alumina ($Al_2O_3$), which is transparent to light wavelengths between about 170 nm and 5300 nm, five (5) times stronger than glass, and nine (9) on the Mohs scale of hardness. Sapphire is also a good electrical insulator and has a high thermal conductivity. Sapphire may be particularly advantageous in manufacturing of blue and green light emitting diodes ("LEDs"). Sapphire also has potential for replacing the existing glass covering the screen for a mobile device including, but not limited to, telephones, cameras, computers and the like. Thus, the laser processing systems and methods described herein may be used to cut sapphire substrates to a desired shape for use in manufacturing photonic devices, screens and other products incorporating sapphire.

As used herein, "edge defect" refers to chipping, cracking, stress concentrations and/or other defects having a tendency to cause crack propagation in hard dielectric material, which are located at a cut edge of a part. As used herein, "bevel" and "beveling" refer to the use of a laser to remove material at an edge of a part such that at least a portion of the edge is no longer perpendicular to a surface of the part and includes chamfering. As used herein, "polish" and "polishing" refer to the use of a laser to ablate and/or melt material on an edge of a part such that the edge becomes smoother without substantially changing the angle of the edge relative to the surface of the part.

As used herein, "wavelength" refers to an approximate emission wavelength of a laser and may encompass a band or range of wavelengths around the stated wavelength. As used herein, "ultraviolet (UV) range" refers to a spectral range of 10 nm to 380 nm, "visible range" refers to a spectral range of 380 nm to 700 nm, "green range" refers to a range at or near 532 nm, and "infra-red range" refers to a spectral range of 700 nm to 10.6 µm. As used herein, "ultrafast laser" refers to a laser that emits laser pulses with a duration or pulse width of less than 1 nanosecond and including durations of picoseconds and femtoseconds and "picosecond laser" refers to a laser that emits laser pulses with a duration or pulse width between 1 picosecond and 1 nanosecond. As used herein, "absorption center" refers to a location in a non-absorptive material where the properties of the material have been modified (e.g., craters, roughening, optical damage, internal material defects, color centers, bulk material property changes, or increased temperature) such that light is more likely to be absorbed as compared to an unmodified region of the material.

Referring to FIG. 1, an embodiment of a laser processing system 100 is described for processing a workpiece 102, such as a sapphire substrate, using a focused laser beam. The workpiece 102 may also be made from other large bandgap and/or transparent materials including, without limitation, aluminum diamond, gallium nitride, silicon carbide, zinc selenide, silicon, silicon nitride, aluminum nitride, gallium nitride on sapphire, and glass (e.g., fused quartz or silica). Although the example embodiments described herein mostly relate to laser treatment or processing of sapphire or other hard dielectric materials, at least some of these other large bandgap materials can be successfully treated with the disclosed laser processing systems.

In the illustrated embodiment, the laser processing system 100 includes a QCW single mode (SM) fiber laser 110 emitting a single mode, divergence limited laser beam 111 from the downstream end of a processing passive fiber 112. The QCW fiber laser 110 may range in power from 500 W to 50 kW and may have a monolithic, entirely solid state, fiber-to-fiber design that does not require mirrors or optics to align or adjust. The QCW fiber laser 10 may also be modular, built from multiple laser units, each one generating hundreds of watts of output power. This also allows the laser system to incorporate reserve modules and power margins. The QCW SM fiber laser may include, for example, a QCW SM ytterbium fiber laser with an emission wavelength of about 1070 nm, such as the QCW series available from IPG Photonics Corporation. In other embodiments, the laser may include a fiber disc laser or a rod laser such as a Nd: YAG laser. Multi-mode lasers may also be used.

The laser processing system 100 also includes a collimator 130 to collimate the beam 111 and a beam bender or reflector 132 to direct the beam 111 to a focus lens 140. The focus lens 140 may focus the beam 111 to a relatively small spot size, for example, in a range of about 14-30 μm. Alternatively or additionally, other optics may also be used for modifying and/or directing the laser light to the desired location. Such optics may include, without limitation, beam expanders, beam collimators, beam shaping lenses, reflectors, masks, beamsplitters and scanners (e.g., a galvanometer).

The laser processing system 100 further includes a laser head including a nozzle 160 coupled to a gas delivery system 162. The gas delivery system 162 may provide a stream of inert gas, such as nitrogen, argon or helium, to the nozzle 160 close to the work area when processing the workpiece 102. The gas may be delivered with a pressure in a range of about 100 to 300 psi. The presence of the inert atmosphere improves the efficiency of the laser processing.

The laser processing system 100 further includes a translation stage 170 configured to impart a translational motion to the workpiece 102 in one or more axes or dimensions, thereby allowing the workpiece 102 to move relative to the focused laser beam. The translation stage 170 may be operated manually or may receive commands from a controller 172. Alternatively, the laser 110 may be moved and displaced relative to the workpiece 102 to be processed. The controller 172 includes processing circuitry, such as a central processing unit ("CPU"), to communicate with translation stage 170.

The QWC SM fiber laser 110 includes a pump source 114 operable to be switched on for time intervals having a duration long enough to operate the laser as close to its steady state as possible, i.e. the laser is optically in the state of continuous-wave operation, also referred to as a quasi-continuous wave (QCW) mode. The controller 172 may be used to control the pump source 114. The percentage of time the laser is switched on, i.e., the duty cycle, is selected to reduce the heating and heat related problems. The controller 172 may control the pump source 114, for example, to have a duty cycle in a range of about 1% to 15%. Therefore, the QCW SM fiber laser 110 operating in the QCW mode may have higher output peak powers and lower average powers. For cutting hard dielectric materials, the pulse width or duration may range from 10 us to 600 us depending upon the thickness of the cut with the shorter pulse durations being possible for sapphire less than 400 microns thick and longer pulse durations for increased thicknesses over 1 mm.

Various machining techniques may improve cutting of hard dielectric materials using the laser processing system 100 described above. The laser processing system 100, for example, may perform substantially constant speed machining without stopping to maintain the cut and minimize cracks and/or constant pulse spacing to maintain a substantially constant average power applied to the workpiece 102. Once a cut is initiated in the workpiece 102 made of sapphire, for example, the properties of the molten sapphire change dramatically (e.g., reflectively decreases) and maintaining a substantially constant speed and/or average power may avoid cutting inconsistencies caused by drastic variations in temperature. If the cutting speed increases or decreases, the laser parameters may be adjusted in real time to maintain a substantially constant average power. Maintaining substantially constant average power may also improve cutting in highly stressed sapphire. Stress may also be relieved in highly stressed sapphire by drilling stress relief holes in the sapphire prior to cutting.

In other embodiments, different process parameters (e.g., cutting speed and repetition rate) may be used per cutting axis for different sapphire types such as A-plane sapphire and C-plane sapphire. Because the C-plane is the base of the hexagonal sapphire crystal, cutting normal to the C-plane may demonstrate symmetry in cut quality.

In further embodiments, the focus placement of the laser beam may be optimized based on the material thickness. For a 1 mm sapphire workpiece, for example, the range of focus of the laser beam may be from 250 μm inside the material (i.e., −250 μm) up to 1 mm above the material (i.e., +1000 μm) in order to obtain an optimum quality and part separation. For a 0.4 mm thickness, the range may be from −200 μm to +200 μm.

In one example, a sapphire substrate with a thickness of 0.7 mm was processed using the following process and laser parameters: a Ytterbium (Yb) single mode laser; 1070 nm wavelength; 14 μm fiber core diameter; 60 mm collimating distance; 123 mm focal length; 28.7 μm spot size; 900 W peak power; 87.5 us pulse duration; 400 Hz pulse frequency; 78.7 mJ pulse energy; argon or nitrogen assist gas at 250 psi; 0.5 mm nozzle stand off; 1.5 mm nozzle orifice; and 8.46 mm/s cutting speed.

In another example, sample sapphire substrates of different thicknesses (e.g., 0.015 in. and 0.040 in.) were processed with different processing operations (e.g., scribing, cutting, and drilling) using a Yb-doped QCW SM fiber laser at different duty cycles, pulse frequencies and speeds. The following Table I illustrates the parameters used for these processing operations:

TABLE I

| Sapphire thickness (inches) | Process | Power (W) | Frequency (Hz) | Duty Cycle (%) | Speed (inches per minute ("ipm")) | Assist gas |
|---|---|---|---|---|---|---|
| 0.015" | Scribing | 285 | 3500 | 20 | 420 | 30 psi $N_2$ |
| 0.015" | Cutting | 285 | 2000 | 40 | 40 | 30 psi $N_2$ |
| 0.015" | Drilling | 285 | 2000 | 40 | <10 | 30 psi $N_2$ |
| 0.040" | Scribing | 285 | 2500 | 25 | 360 | 30 psi $N_2$ |
| 0.040" | Scribing | 285 | 500 | 30 | 30 | 30 psi $N_2$ |
| 0.040" | Drilling | 285 | 2000 | 30 | <10 | 30 psi $N_2$ |

In this example, scribing of the 0.015"-thick sapphire sample with a laser beam at 285 W removed about 30% of the thickness of the sample at a speed of about 420 ipm. Cutting the 0.015"-thick sapphire sample was also effective at a 285 W power and speed of about 40 ipm. Drilling circular holes in the sapphire samples was successful at relatively low speeds. The same processing operations were also successfully performed on the 0.040" thick wafer.

These examples illustrate that sapphire substrates can be efficiently processed by a QCW SM fiber laser at a wavelength in the range of about 1060-1070 nm. The single mode beam with a relatively small spot provides a high power density capable of breaking down the material. Better processing appears to be possible at lower duty cycles, i.e., low average powers. The peak power and average power may need to be higher as the material thickness increases, but the low duty cycle appears to be more of a key factor than peak power.

In a further example, a high-quality cut may be achieved at 900 W, 500 Hz and 3% duty cycle (i.e., average power of 27 W) with a speed of 20 inches/min. In this example, the cutting speed may be doubled to 40 inch/min by increasing the pulse frequency to 1000 Hz. The quality of the cut may deteriorate in response to scaling up the laser power. Also, the quality may improve at shorter pulse widths (e.g., 50-100 microseconds), which may lead to a high-speed process. The longer pulses also provide high quality cuts, but increasing the duty cycle results in longer periods of time to complete the processing.

In yet another example, sapphire substrates with a thickness between about 0.4 mm and 0.7 mm were processed using the following process and laser parameters: a Ytterbium (Yb) single mode laser; 1070 nm wavelength; 14 μm fiber core diameter; 60 mm collimating distance; 123 mm focal length; 28.7 μm spot size; argon or nitrogen assist gas at 250 psi; and 1.5 mm nozzle orifice. The following Table II shows the results of processing using the above parameters with different peak power, frequency, duty cycle, pulse width and cut speed.

sensitive to high frequencies with significant chipping occurring at higher frequencies. The quality of the cuts also depends on the duration of duty cycle with a lower the duty cycle improving the cut quality. Peak power above 1600 W with a duty cycle of up to 10% may not provide any visible advantages, but a duty cycle lower than 1% may deteriorate the quality of cuts. A gas pressure range between 200 and 300 psi also improved the efficiency of the process in these examples. The beam spot size is generally between about 14 and 30 microns, and using a spot size lower than 14 microns generally does not substantially affect the quality and efficiency of the process.

In a further example, sapphire substrates with a thickness of 2.7 mm were successfully cut using a multimode QCW laser with a 50 micron fiber with the following parameters: 15 kW peak power; 450 W average power; 0.6 ms pulse width; 100 micron spot size; 50 Hz repetition rate; 3% duty cycle; 10 ipm speed; argon gas at 100 psi; a 1.5 mm nozzle diameter; and a 1 mm standoff. The use of argon or helium as the assist gas was found to improve cutting efficiency, possibly because of the trace Ti found in sapphire.

Figure 2:
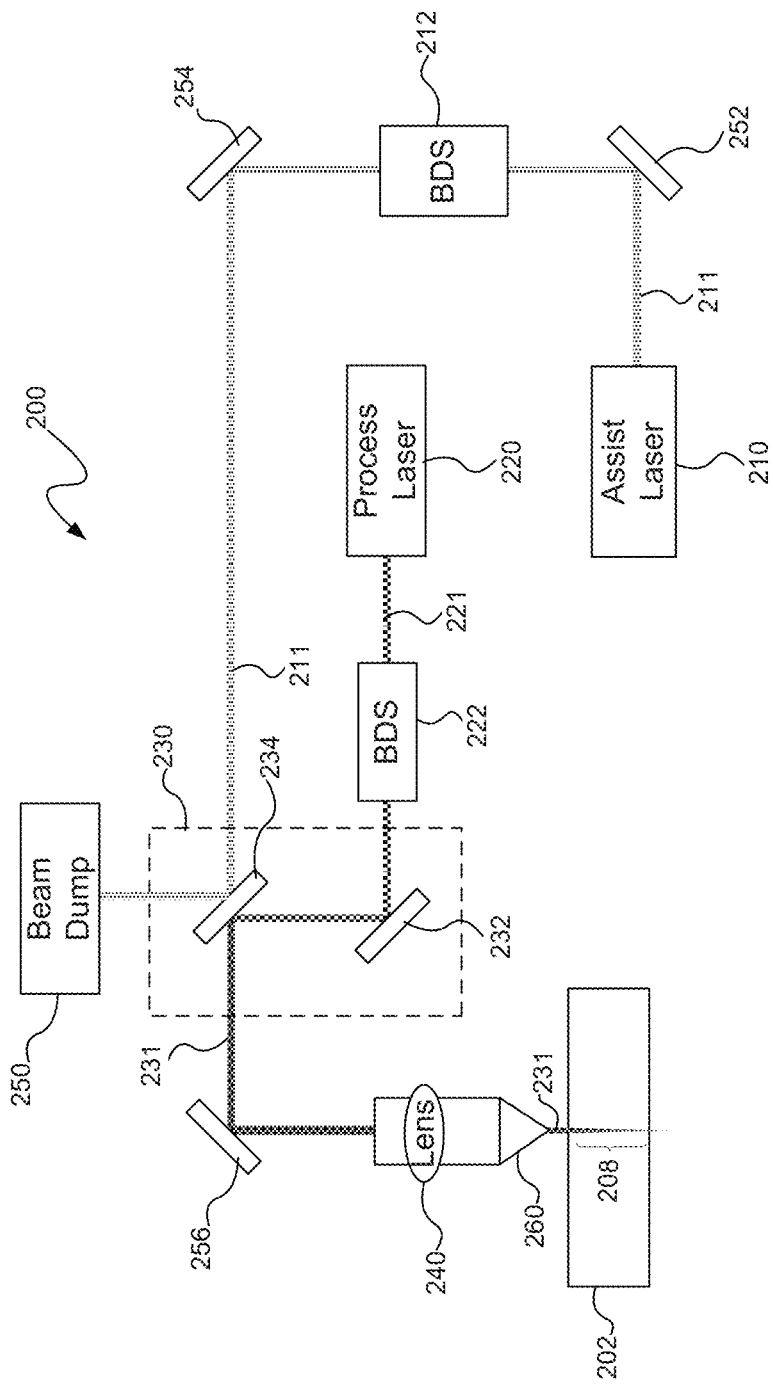
FIG. 2 is a schematic diagram of a multiple-beam laser processing system, consistent with another embodiment of the present disclosure.

Referring to FIG. 2, a multiple-beam laser processing system 200 may also be used to process sapphire or other hard dielectric materials. Multiple-beam laser processing may be performed on a sapphire substrate or workpiece 202 using both an assist laser beam 211 and a process laser beam 221 with different characteristics (e.g., wavelengths and/or pulse durations). The assist laser beam 211 is directed at a target location 208 on or within the workpiece 202 to modify a property of the sapphire (e.g., induce damage or increase temperature) such that absorption centers are formed in the sapphire. The process laser beam 221 is directed at the target location 208 and is coupled into the absorption centers formed in the sapphire to complete processing of the sapphire. The assist laser beam 211 and the process laser beam 221 individually are not capable of completely processing the sapphire workpiece but together (either simultaneously or sequentially) provide a synergy that enables processing.

TABLE II

| # | Material | Peak Power (W) | Frequency (Hz) | Duty Cycle (%) | Pulse Width (ms) | Cut Speed (Inch/min) | Comments |
|---|---|---|---|---|---|---|---|
| 1 | 0.4 mm polished | 400 | 160 | 2.75 | 0.171 | 12 | Very fine powdery dross. The dross rubs off easily just by wiping it. Some chipping and cracks. Less than <30 microns at random places. |
| 2 | 0.7 mm unpolished | 900 | 400 | 3.5 | 0.0875 | 16-20 | Very fine powdery dross. The dross rubs off easily just by wiping it. No cracking but some chipping. Less than <40 microns at random places. |
| 3 | 0.7 mm unpolished | 750 | 300 | 3.5 | 0.116 | 12 | Very fine powdery dross. The dross rubs off easily just by wiping it. No cracking but some chipping. Less than <40 microns at random places. Optics used is 200 Focal/120 mm collimator. |

Based on the foregoing, a QCW SM laser with a wavelength in a range of 1060-1070 nm can be successfully used for cutting a sapphire substrate with minimal cracks and chipping. In the above example, the 0.7 mm thick substrate has better cut quality. The 0.4 mm thick substrate exhibits chips along the edge of the cuts; however, the chips are generally less than 40 microns, which is considered to be a high quality cut as known to one of ordinary skill. The laser processing method disclosed herein also appears to be The illustrated embodiment of the multiple-beam laser processing system 200 includes an assist laser 210 for generating the assist laser beam 211 (e.g., a green laser of about 532 nm) and a process laser 220 for generating the process laser beam 221 (e.g., a QCW SM fiber laser of about 1060 to 1070 nm). The assist and process lasers 210, 220 are optically coupled to respective beam delivery systems 212, 222 for modifying the assist and process laser beams 211, 221, respectively, before combining the beams. The multiple-beam laser processing system 200 further includes a beam combiner 230, a focus lens 240, a laser processing head 260, and one or more reflectors or mirrors 252, 254, 256 for directing the assist and process laser beams 211, 221 as a combined laser beam 231 to the same target location 208 on or within a workpiece 202.

Although the illustrated embodiment shows the assist and process laser beams 211, 221 being combined simultaneously, the beams 211, 221 may also be combined such that the beams are directed to the same target location 208 at different times. Directing the laser beams 211, 221 simultaneously may include any amount of overlap between the bursts or pulses of the laser beams 211, 221 and does not necessarily require the laser beams to have the same burst or pulse duration. The assist laser beam 211 may start before or during the process laser beam 221. The laser beams 211, 221 may also be directed to the workpiece 202 at different times, for example, with the assist laser beam 211 before the process laser beam 221.

In the illustrated embodiment, the assist laser 210 may be a rare-earth-doped fiber laser such as a GLP Series pulsed green fiber laser available from IPG Photonics Corporation. In other embodiments, the assist laser 210 may include diode pumped solid state (DPSS) lasers, excimer lasers, gas lasers, and other types of lasers known to those skilled in the art. The process laser 220 may also be a rare-earth-doped fiber laser such as a QCW Series single-mode ytterbium fiber laser available from IPG Photonics Corporation.

The assist laser beam delivery system 212 may include a variable telescope to provide beam expansion and divergence control of the assist laser beam 211. In particular, the divergence of the assist laser beam 211 may be controlled to have an optimized numerical aperture (NA) to create substantially the same focal plane as the process laser beam 221 after the laser beams 211, 221 are combined. The process laser beam delivery system 222 may include a collimator such as, for example, a collimating lens with a focal length of 100 mm. Alternatively or additionally, the beam delivery systems 212, 222 may also include other optics for modifying and/or directing the laser light to the desired location. Such optics may include, without limitation, beam expanders, beam collimators, beam shaping lenses, reflectors, masks, beamsplitters and scanners (e.g., a galvanometer).

In the illustrated embodiment, the beam combiner 230 includes reflectors or mirrors 232, 234 for selectively reflecting the wavelengths of the assist and process laser beams 211, 221, respectively, such that the beams 211, 221 are directed along the same optical axis. The first mirror 232 is coated to reflect the wavelength of the process laser beam 221, and the second mirror 234 is coated on one side to reflect the wavelength of the process laser beam 221 and uncoated on the other side to allow at least a portion of the assist laser beam 211 to pass through. Thus, the second mirror 234 combines both beams 211, 221. In an embodiment with a green assist laser beam 211 and an IR process laser beam 221, for example, the first mirror 232 may be IR coated and the second mirror 234 may be IR coated on one side and uncoated on the other side. The uncoated side of the second mirror 234 may still reflect a portion of the assist laser beam 211 to a beam dump 250. Other embodiments for the beam combiner 230 are also within the scope of the present disclosure.

The mirrors 252, 254, 256 may be coated to reflect the desired wavelengths of the laser beams 211, 221. In an embodiment with a green assist laser beam 211 and an IR process laser beam 221, for example, the mirrors 252, 254 reflecting the green laser beam may be 532 nm or green coated mirrors capable of reflecting the green assist laser beam 211 and the mirror 256 may be a dual IR-green coated mirror capable of reflecting both the green assist laser beam 211 and the IR process laser beam 221. In one embodiment, the transmission of the multiple-beam laser processing system 200 may be 40% for the assist laser beam 211 and 90% for the process laser beam 221.

Although the illustrated embodiment shows free space delivery using mirrors, other optical components may also be used to deliver and/or combine the lasers. For example, one or more fibers may be used to deliver the laser beams to the laser processing head 260. In this embodiment, the lasers may be combined by focusing the lasers to the same location 208 on or within the workpiece 202.

The focus lens 240 may be a singlet focusing lens such as, for example, a lens with an 88 mm focal length and coated for IR. The focus lens 240 may be capable of focusing the laser beams to a beam spot with a diameter or dimension in a range of about 30 to 40 µm. In other embodiments, the beam delivery systems and focus lens 24 may be capable of focusing the lasers 211, 221 to an even smaller beam spot, for example, as small as 15 µm or smaller.

In the illustrated embodiment, the laser processing head 260 includes a gas assist nozzle 262 to direct a pressurized gaseous medium to the workpiece 202 together with the laser beams to facilitate laser processing, for example, when using a thermal cutting process where the gas helps to expel molten material. The gaseous medium may include, for example, oxygen ($O_2$). In other embodiments, the gaseous medium may be an inert gas, such as nitrogen, argon or helium.

Although the illustrated embodiments show multiple lasers 210, 220 generating the assist laser beam 211 and the process laser beam 221, the multiple laser beam processing method may also be performed using the same laser source to produce both the assist laser beam 211 and the process laser beam 221. For example, an assist laser beam may be generated from a laser source with one set of parameters (e.g., a shorter wavelength and/or pulse duration) and a process laser beam may be generated from the same laser source with a different set of parameters (e.g., a longer wavelength and/or pulse duration). A single laser beam generated by a laser source may also be split and modified with different beam delivery systems to produce the assist laser beam and the process laser beam with distinct characteristics.

The laser processing system 100 and the multiple-beam laser processing system 200 described above both may be used to perform cutting and/or post-cut processing of hard dielectric materials as described herein. In the laser processing system 100, for example, the QCW laser 110 may be operated with one set of parameters to generate a first laser beam for cutting and may be operated with another set of parameters (e.g., a different pulse duration, duty cycle, pulse energy, pulse repetition rate, etc.) to generate a second laser beam for post-cut processing. In the multiple-beam laser processing system 200, one of the lasers 220 may be used to generate a laser beam suitable for cutting the hard dielectric material and the other of the lasers 210 may be used to generate a laser beam suitable for post-cut processing the hard dielectric material. Methods for post-cut processing are described in greater detail below.

Figure 3:
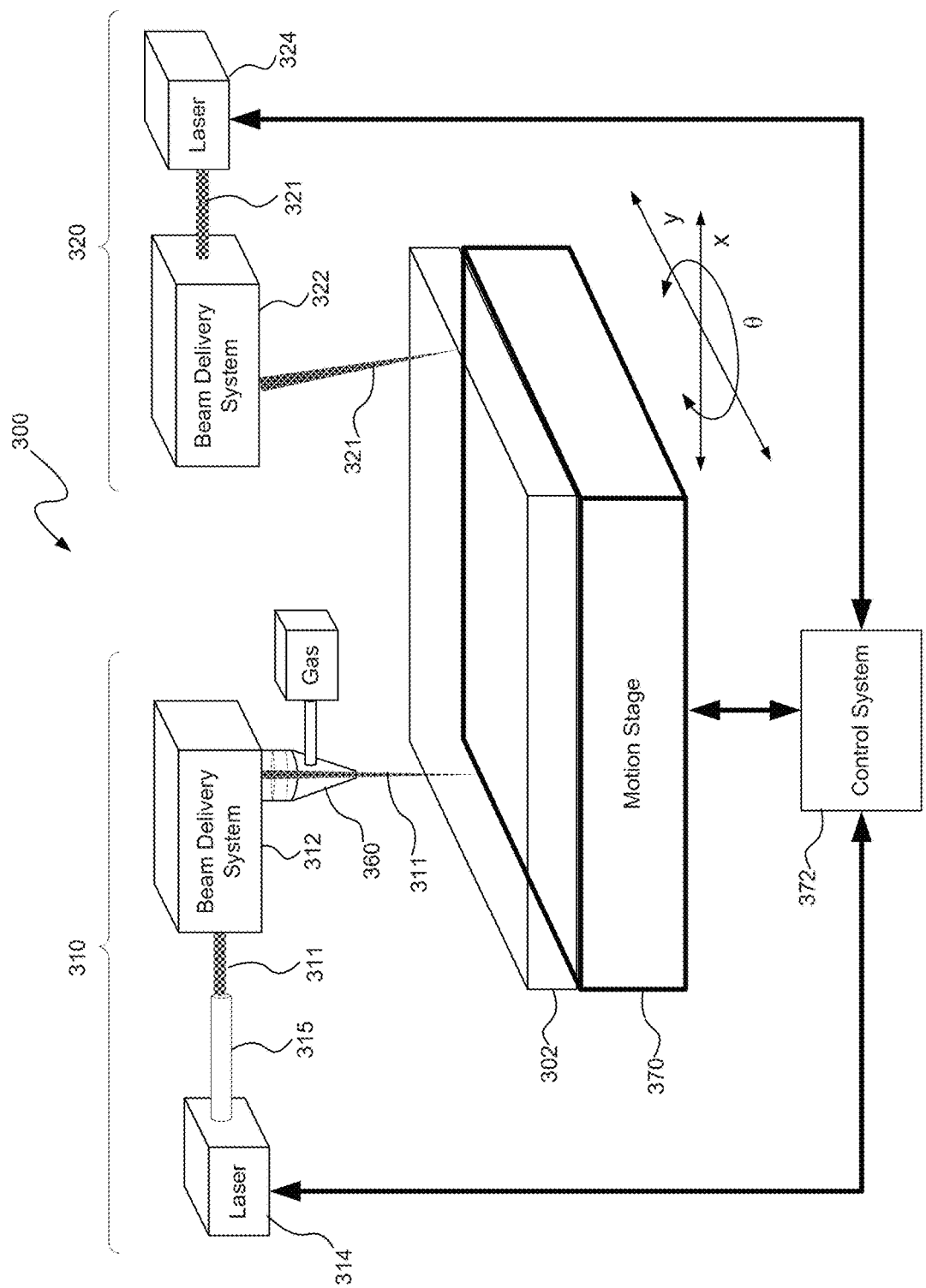
FIG. 3 is a schematic diagram of a multiple-beam laser processing system, consistent with a further embodiment of the present disclosure.

In the embodiment of the multiple-beam laser processing system 200 shown in FIG. 2, the multiple beams are directed at the workpiece along the same optical axis or path using the same laser processing head 260. Referring to FIG. 3, another embodiment of a multiple-beam laser processing system 300 may direct multiple laser beams along different optical axes or paths. In this multiple-beam laser processing system 300, different lasers requiring different optics may be used. This multiple-beam laser processing system 300 may also be used to perform cutting and/or post-cut processing of hard dielectric materials according to the methods described above and below.

The multiple-beam laser processing system 300 generally includes a first laser system 310 for generating and delivering a first laser beam 311 and a second laser system 320 for generating and delivering a second laser beam 321. Each of the laser systems 310, 320 includes a beam delivery system 312, 322 for delivering the respective first and second laser beams 311, 321 generated by respective first and second laser sources 314, 324. The beam delivery systems 312, 32 may be focused beam, shaped beam, scanned beam or thermal cutting head beam delivery systems. The beam delivery systems 312, 322 may include any combination of optics or other elements used in such beam delivery systems including, without limitation, beam expanders, beam collimators, beam shaping lenses, reflectors, masks, beamsplitters, focusing lenses, and scanners (e.g., a galvanometer).

The laser sources 314, 324 may include, without limitation, fiber lasers, diode-pumped solid state (DPSS) lasers, and excimer lasers. In the illustrated embodiment, at least the first laser source 314 is a fiber laser that emits laser light from a fiber 315. The first laser source 314 may include, for example, a QCW fiber laser such as the QCW IR single mode fiber laser described above. At least the first laser system 310 may also include a laser processing head 360 with a gas assist nozzle to direct a pressurized gaseous medium to the workpiece 302 to facilitate laser processing, for example, as described above.

The second laser source 324 generates the second laser beam 321 with different characteristics or parameters (e.g., wavelength, pulse duration, energy, power, orientation) than the first laser beam 311 generated by the first laser system 310. The second laser source 324 may include, for example, a fiber laser of a shorter wavelength (e.g., green) than the first laser source 314 and/or a fiber laser of a shorter pulse duration (e.g., picoseconds or shorter) than the first laser source 314. The second laser source 324 may also include an excimer laser or a DPSS laser.

The second laser system 320 may also be configured to angle the second laser beam 321 relative to the surface of the workpiece 302. For a beveling or polishing operation, for example, the second laser beam 321 may be angled with an angle of incidence that is greater than 0° and less than the critical angle and more preferably in a range of 15° to 65° relative to an axis normal to the surface of the workpiece 302. As used herein, "critical angle" refers to the angle of incidence above which total reflection occurs. One way to angle a laser beam is by directing the laser beam off axis relative to a focal lens. Other techniques for angling the laser may include reflecting the beam at an angle in the beam delivery system and tilting a laser processing head. With a fiber laser, for example, the fiber delivery may be provided directly to a laser processing head, which is moved like a multi axis robot around the part. In other examples, the part may be moved in multiple axes with the beam not moving.

The multiple-beam laser processing system 300 further includes at least one motion stage 370 for supporting the workpiece 302 and moving the workpiece 302 in one or more axes or directions relative to the first laser beam 311 and/or the second laser beam 321. The motion stage 370 may include an X-Y theta motion stage capable of rotating the workpiece and moving the workpiece along the X and Y axes, such as the type known to those skilled in the art and currently available. The motion stage 370 may also be capable of tilting the workpiece 302 relative to a laser beam, for example, instead of angling the laser beam. Although one motion stage 370 is shown, the multiple-beam laser processing system 300 may include a motion stage for each of the laser systems 310, 320 and the workpiece 302 may be transferred from one motion stage to the other for processing by the different laser systems 310, 320. A control system 372 may be used to control the motion stage 370 as well as the operation of the laser systems 310, 320. The control system 372 may include any combination of hardware and software used for controlling laser machining systems.

In at least one embodiment, the first laser system 310 is used for cutting hard dielectric materials and the second laser system 320 is used for post-cut processing a part cut from a hard dielectric material. The first laser source 314 may thus be a laser source suited to cutting hard dielectric materials efficiently and with a relatively high speed such as a QCW IR laser as described above. The second laser source 324 may be a laser source suited to beveling and/or polishing cut edges of the part cut from a hard dielectric material to reduce or remove edge defects without inducing additional sub-surface stress. Thus, when the first laser system 310 cuts a part and creates edge defects such as stress concentrations, the second laser system 320 may be used to return the cut parts to a pre-cut stress condition. In general, laser beams that provide better absorption and coupling with the hard dielectric material without significant thermal effects may be better suited for beveling and/or polishing.

In some embodiments, the second laser source 324 may include a shorter wavelength laser, such as 193 nm or 248 nm excimer lasers, or a shorter pulse laser such as an ultrafast laser (e.g., a picosecond laser or a femtosecond laser). In transparent materials, the shorter wavelength lasers provide better absorption because of the higher photon energy and the shorter pulse lasers provide higher nonlinear absorption because of the higher peak power. Where the second laser source 324 is an ultrafast or picosecond laser, for example, the laser beam may be generated with a wavelength in the IR range (e.g., 1060-1070 nm), the green range (e.g., 532 nm), or the UV range (e.g., 266 nm, 355 nm), with an energy density in a range of about 5 to 15 J/cm$^2$ and with a pulse repetition rate of greater than 200 kHz. An ultrafast or picosecond laser may be directed at the workpiece with a high scanning speed galvo process. Where the second laser source 324 is an excimer laser, for example, the laser beam may be generated with a pulse duration in a range of 10 to 30 ns, with an energy density in a range of 10 to 20 J/cm$^2$, and a repetition rate in a range of 100 to 400 Hz. An excimer laser may be directed at the workpiece with an imaging technique and stage-based process that moves the workpiece relative to the laser beam. QCW lasers with good focusability (e.g., M2<1.05 for single mode) are also capable of providing higher power densities for coupling. Other lasers may also be used for the second laser source 324 including other fiber lasers or excimer lasers in the UV range or the visible range and with other pulse durations.

For any of the beveling and polishing operations described in greater detail below, the laser beam may be generated with parameters that provide the absorption sufficient to ablate and/or melt the material, depending upon the operation, without undesired thermal effects. The process parameters of the laser may be adjusted differently for polishing than for beveling. In a polishing operation, for example, a lower energy density may be used to achieve a smaller removal rate per pulse and less affectation of surrounding material.

In other embodiments, at least one of the laser systems 310, 320 may be used to perform multiple processing operations. The first laser system 310 may be used, for example, to cut a part from a hard dielectric material and then to bevel the edges of the cut part and the second laser system 320 may be used to polish the beveled edges.

Figure 4C:
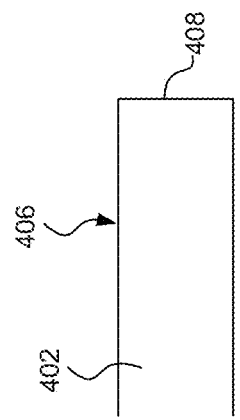
FIGS. 4A-4C illustrate a method for polishing a cut edge of a part cut from a hard dielectric material, consistent with an embodiment of the present disclosure.
Figure 4B:
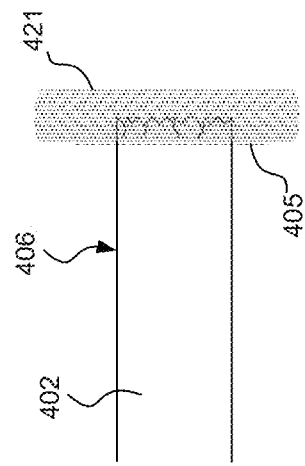
Figure 4A:
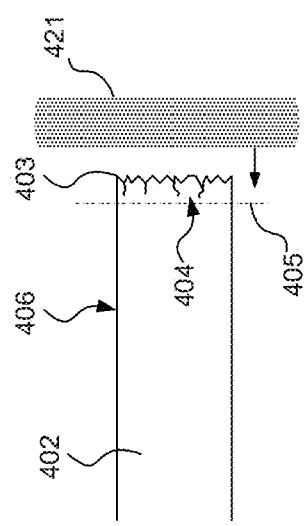

FIGS. 4A-4C show one method for polishing a cut edge 403 of a cut part 402 cut from a hard dielectric material. As shown, the cut part 402 includes edge defects 404, such as chipping and cracks, proximate the cut edge 403. These edge defects 404 may be a result of laser cutting the part 402 from a hard dielectric material, for example, using a QCW IR fiber laser. In this example, the cut edge 403 is substantially perpendicular to a surface 406 of the cut part 402 and the laser beam 421 is directed substantially perpendicular or normal to the surface 406 of the cut part 402. The laser beam 421 may be located at a depth 405 (FIGS. 4A and 4B) sufficient to remove and/or modify (e.g., by ablation and/or melting) the material at the cut edge 403 such that the edge defects 404 are removed or reduced. In one example, the depth 405 of material removal may be in a range of about 10-30 microns. The laser beam 421 may be scanned along the edge 403 (e.g., by moving the beam 421 and/or the cut part 402) to produce a polished edge 408 (FIG. 4C) along a length of the part 402.

Figure 5C:
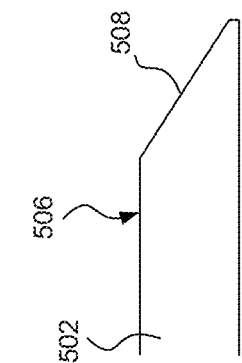
FIGS. 5A-5C illustrate a method for polishing a beveled cut edge of a part cut from a hard dielectric material, consistent with another embodiment of the present disclosure.
Figure 5B:
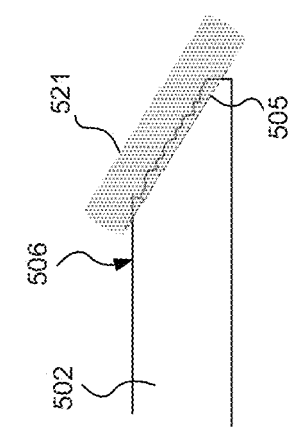
Figure 5A:
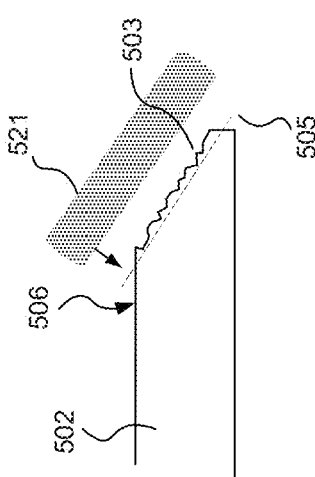

FIGS. 5A-5C show another method for polishing a beveled edge 503 of a cut part 502 cut from a hard dielectric material. In this example, the beveled edge 503 forms an angle relative to the surface 506 of the cut part 502. The beveled edge 503 may be formed when the cut part 502 is first cut from a hard dielectric material by cutting with an angled beam. The beveled edge 503 may also be formed after the cut part 502 is first cut with a straight or perpendicular cut and then beveled, for example, using one of the beveling operations described below. The beveled edge 503 may thus include edge defects (not shown) resulting from the cut and/or a rough surface from the beveling operation. The laser beam 521 may be angled (e.g., shown with about a 60° angle of incidence) to correspond approximately to the angle of the beveled edge 503 and located at a depth 505 (FIGS. 5A and 5B) sufficient to remove and/or modify (e.g., by ablation and/or melting) the material at the beveled edge 503 such that edge defects and/or surface roughness are removed or reduced. In one example, the depth 505 of material removal may be in a range of about 10-30 microns. The angled laser beam 521 may be scanned along the beveled edge 503 (e.g., by moving the beam 521 and/or the cut part 502) to produce a polished, beveled edge 508 (FIG. 5C) along a length of the part 502.

FIGS. 6A-6D show one method for beveling an edge 603 of a cut part 602 cut from a hard dielectric material. In this example, a straight laser beam 621 is directed perpendicular or normal to a surface 606 of the cut part 602 to remove a layer of material (e.g., by ablation) proximate the edge 603 by scanning the laser beam 621 along the edge 603 (e.g., by moving the beam 621 and/or the cut part 602). After each layer of material is removed, the cut part 602 is moved away from the beam 621 such that the laser beam 621 removes material to a greater depth closer to the edge 603, thereby laser milling the cut part to form a beveled edge 608. The beveled edge 608 may have a surface roughness, which may be removed by laser polishing the beveled edge 608 as describe above.

FIGS. 7A-7D show another method for beveling an edge 703 of a cut part 702 cut from a hard dielectric material. In this example, an angled laser beam 721 (e.g., shown at about 45° angle of incidence) is used to remove angled layers of material (e.g., by ablation) proximate the edge 703 by scanning the angled laser beam 721 along the edge 703 (e.g., by moving the beam 721 and/or the cut part 702). After each angled layer of material is removed, the cut part 702 is moved toward the angled laser beam 721 such that the angled laser beam 721 removes material to a greater depth at the edge 703, thereby laser milling the cut part to form a beveled edge 708.

FIGS. 8A and 8B show a further method for beveling an edge 803 of a cut part 802 cut from a hard dielectric material. In this example, an angled laser beam 821 is directed at an angle relative to a surface 806 of the cut part 802 and scanned along the edge 803 (e.g., by moving the beam 821 and/or the cut part 802) to remove the edge 803 leaving a beveled edge 808.

Although the above techniques for beveling and polishing generally involve the laser beam at a fixed angle relative to the edge being beveled or polished, various machining strategies may be used to control the angle of the laser beam. The angle of the laser beam may be controlled, for example, to bevel a straight bevel at different angles. The orientation of an angled laser beam relative to the part may also be controlled to change a cut angle within a range of angles to bevel a rounded bevel as described below.

Figure 9A:
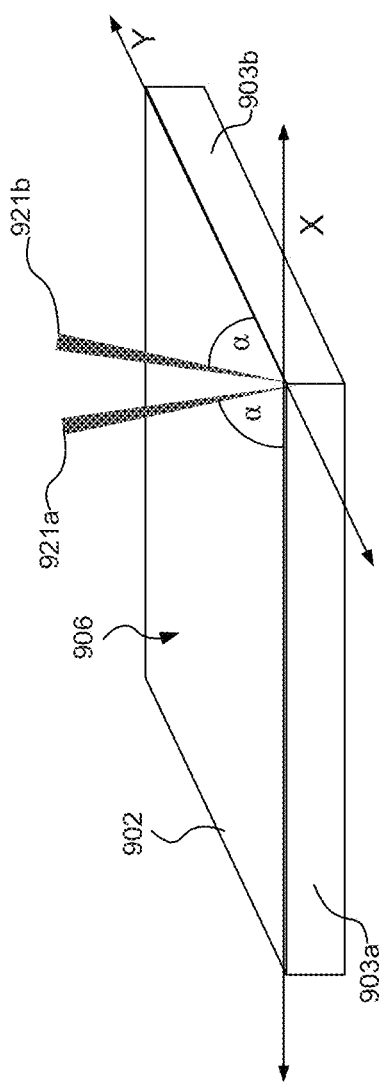
FIG. 9A is a perspective view of an angled laser beam aligned with different axes relative to a part, consistent with an embodiment of the present disclosure.
Figure 9B:
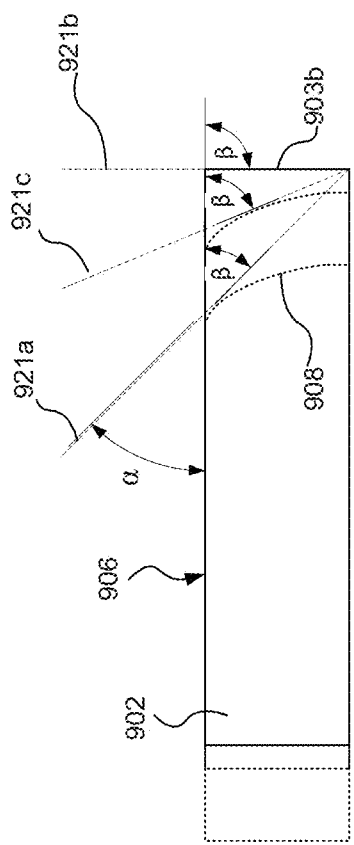
FIGS. 9B and 9C illustrate a method for beveling an edge of a part by moving the cut part with coordinated motion relative to continuously change the angle of the angled laser beam to produce a rounded bevel, consistent with an embodiment of the present disclosure.
Figure 9C:
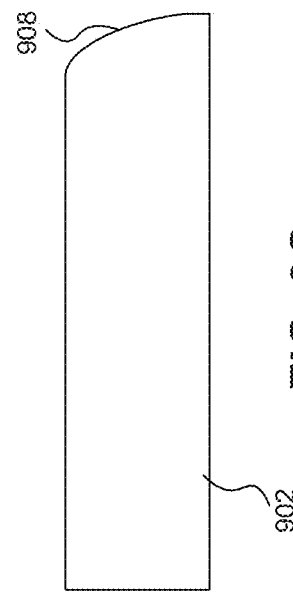

FIGS. 9A-9C illustrate one way to change a cut angle β by changing an orientation of an angled laser beam relative to the edge of the cut part 902. The angled laser beam 921a, 921b (shown in FIG. 9A in two different orientations aligned with different edges 903a, 903b) forms an angle α relative to a surface 906 of the cut part 902 (i.e., in a plane containing the laser beam and normal to the surface 906). The cut angle β is the angle of the cut edge surface relative to the surface 906 of the part 902 as the angled laser beam moves relative to the part (see FIG. 9B). By changing the orientation of the angled laser beam 921a, 921b relative to the edges 903a, 903b of the cut part 902, the cut angle β may be changed while the laser angle α remains the same.

In this example, the change in orientation of the angled laser beam 921a, 921b is coordinated with respect to the positioning of the part 902 to produce different cut angles. When the angled laser beam 921a is aligned with the X axis (and edge 903a) as shown, the angled laser beam 921a would machine a straight side wall (i.e., a cut angle β of 90°) in the edge 903a of the part 902 when scanned along the X axis and would machine an angled side wall or bevel (i.e., a cut angle β equal to the laser angle α) in the edge 903b of the part 902 when scanned along the Y axis. When the angled laser beam 921b is aligned with the Y axis (and edge 903b) as shown, the angled laser beam 921b would machine a straight side wall in the edge 903b of the part 902 when scanned along the Y axis and would machine an angled side wall or bevel in the edge 903a of the part 902 when scanned along the X axis.

The orientation or alignment of the angled laser beam 921a, 921b may be changed relative to the part 902 by rotating the angled laser beam and/or by rotating the part, which causes the angled laser beam 921a, 921b to present different cut angles 13 relative to the edges 903a, 903b of the part 902. When beveling a rectangular part 902 with a cut angle β equal to the laser angle α, for example, the angled laser beam 921a aligned with the X axis may be scanned along the Y axis to form a straight bevel on one edge 903b and then the part and/or the beam may be rotated 90° such that the angled laser beam 921b aligned with the Y axis may be scanned along the X axis to form a straight bevel on the adjacent edge 903a.

As shown in FIG. 9B, the cut angle β may be varied within a range of angles between 90° (when aligned with the scanning axis) and the laser angle α (when perpendicular to the scanning axis) by changing the orientation of the angled laser beam relative to the part 902 (e.g., by rotating the angled laser beam and/or by rotating the part). FIG. 9B shows the angled laser beam 921a aligned with the X axis (i.e., a cut angle β of 90°), the angled laser beam 921b aligned with the Y axis (i.e., a cut angle β equal to the laser angle α), and the angled laser beam 921c at an intermediate alignment position (i.e., a cut angle β between 90° and the laser angle α). The part 902 may be moved with coordinated motion in multiple axes to change the orientation of the angled laser beam relative to the part 902 and thus to change the cut angle β within this range of angles. Although the angled beam 921c is shown at only one intermediate alignment position, the angled beam 921c may be moved to multiple intermediate alignment positions corresponding to different cut angles within the range of cut angles. The angled laser beam 921a-921c may thus be scanned along the edge 903b with different orientations such that the angled laser beam provides a range of cut angles along the edge 903b to form a rounded bevel 908, as shown in FIG. 9C.

FIGS. 10A and 10B show another method for changing the cut angle of a laser beam 1021 relative to a cut part 1002. In this example, the laser beam 1021 is directed with an angle of incidence of 0° (e.g., 90° relative to the horizontal plane) and the cut part 1002 is moved away from the horizontal plane to change the angle of the laser beam 1021 relative to the part 1002 and thus the cut angle. The cut part 1002 may be moved to provide a range of cut angles and the laser 1021 may be scanned along an edge 1003 to bevel at multiple cut angles to form a rounded bevel 1008.

Figure 11B:
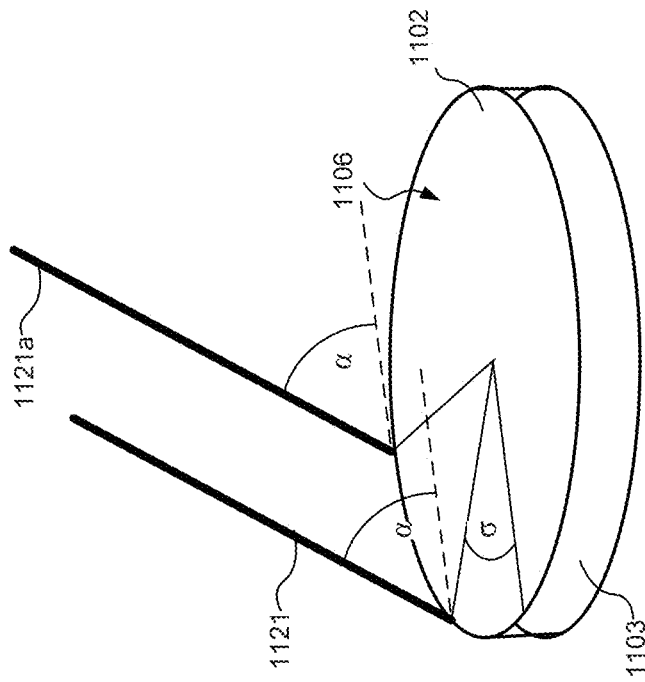
FIGS. 11A and 11B are perspective views of an angled laser beam oriented relative to a circular part with the angled beam aligned at different angles relative to the radius of the circular part to provide different bevel angles, consistent with an embodiment of the present disclosure.
Figure 11A:
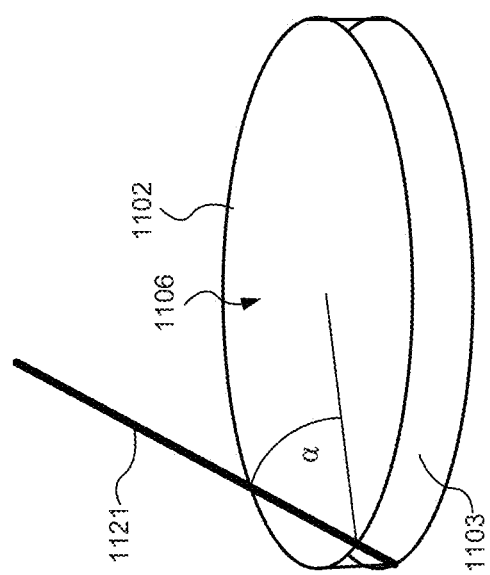

Referring to FIGS. 11A and 11B, an angled laser beam 1121 may also be used to bevel a circular part 1102. The angled laser beam forms an angle α relative to a surface 1106 of the circular part 1102, but the cut angle may be changed without changing the angle α by changing the orientation of the circular part 1102 relative to the angled laser beam 1121. Where the angled laser beam 1121 is aligned with the radius of the circular part 1102 (FIG. 11A), for example, the angled laser beam 1121 will cut a beveled edge with a cut angle corresponding to the angle α. Where the angled beam 1121 is moved to a different position at a beam angle σ relative to the radius, the angled beam 1121 will cut a beveled edge at some cut angle greater than the angle α. When the angled beam 1121a is at a beam angle of 90°, the angled beam 1121a cuts the edge 1103 normal to the surface 1106 of the part 1102 (i.e., a cut angle of 90°). Thus, the orientation of the circular part 1102 may be changed to change the alignment of the angled laser beam 1121 and thus to change the cut angle.

Figure 12A:
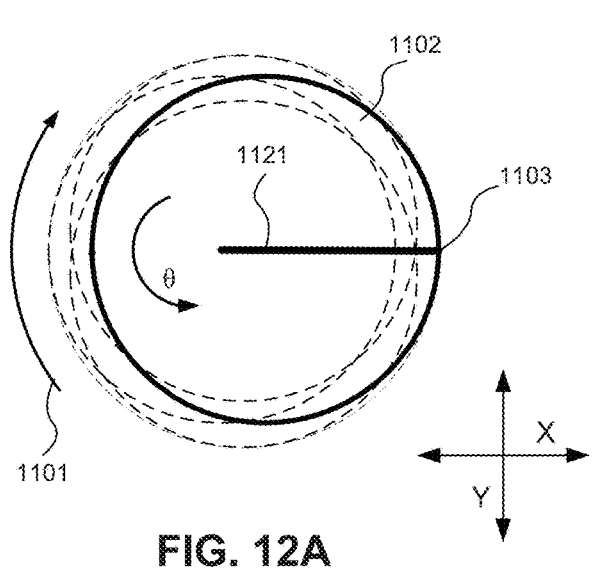
FIGS. 12A and 12B illustrate coordinated motion of a circular part relative to an angled beam for beveling an edge of the circular part, consistent with embodiments of the present disclosure.
Figure 12B:
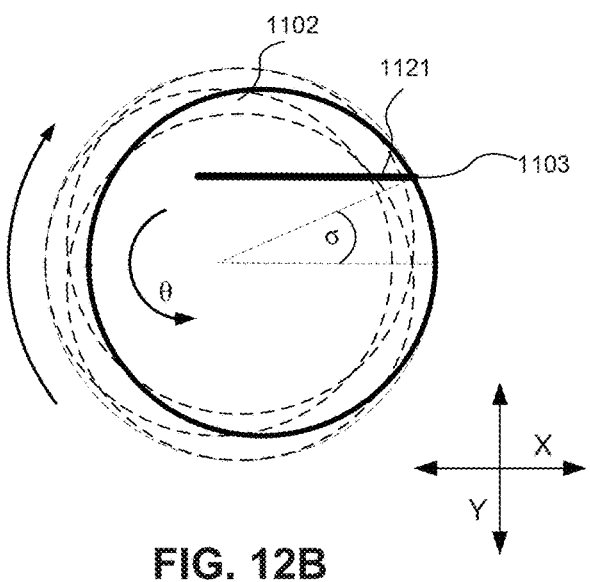
Figure 13:
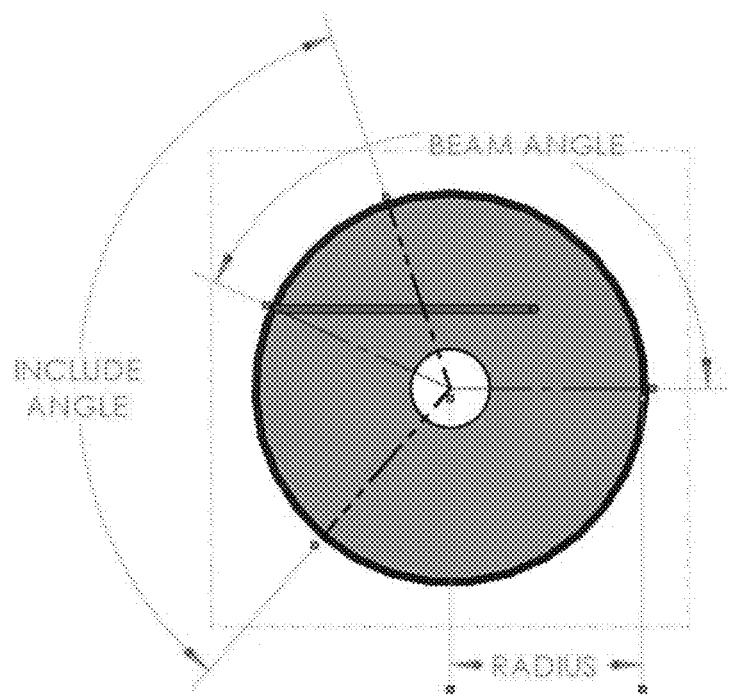
FIG. 13 is a schematic diagram of a circular part illustrating parameters for providing coordinated motion for beveling an edge of the circular part, consistent with an embodiment of the present disclosure.
Figure 14:
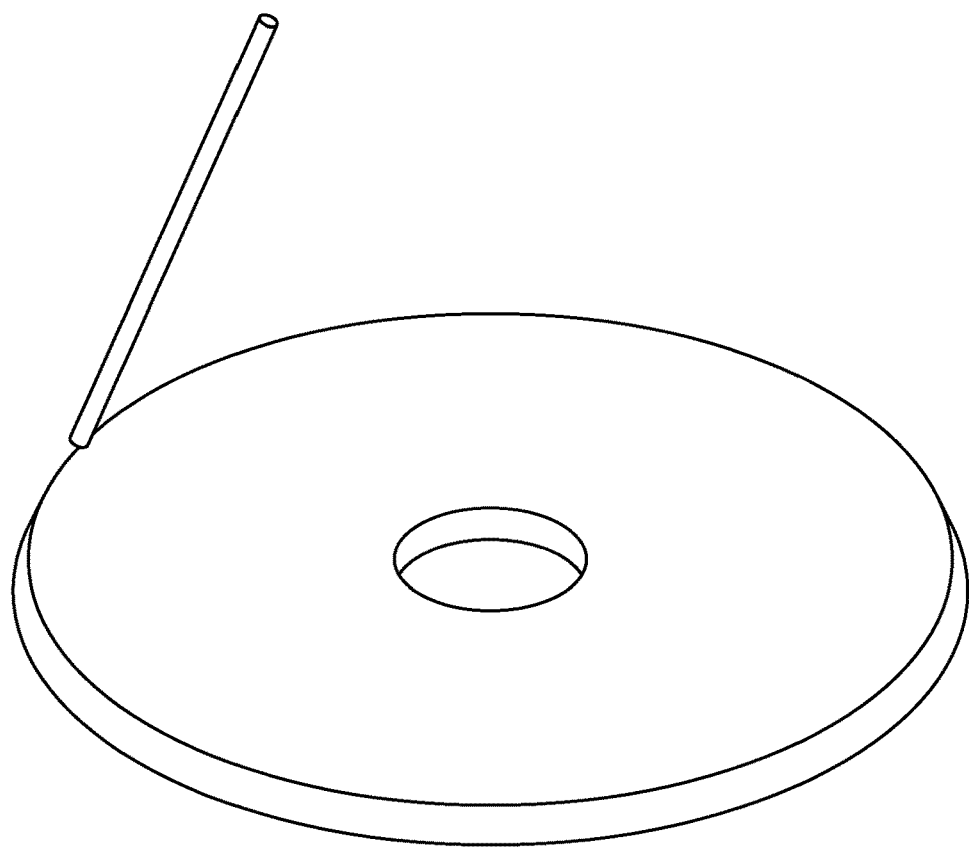
FIG. 14 is perspective view of a circular part with a laser beam forming a straight beveled edge.
Figure 15:
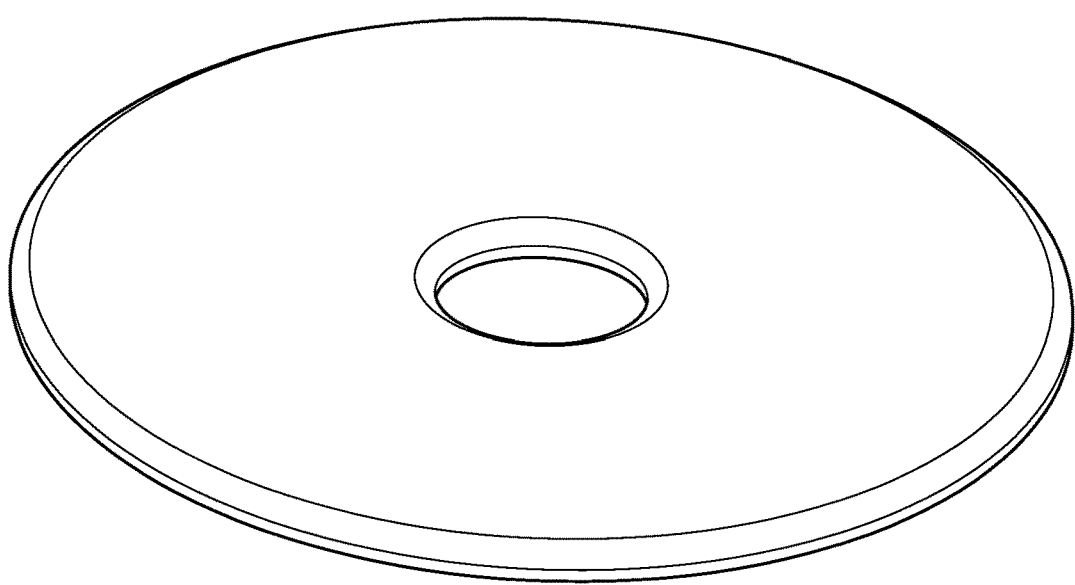
FIG. 15 is a perspective view of a circular part with a rounded beveled edge.

As shown in FIGS. 12A and 12B, the circular part 1102 may be moved with coordinated motion in multiple axes to bevel the circular edge 1103 of the part. In one example, the circular part 1102 may be moved with a generally circular motion (as indicated by arrow 1101) by moving the motion stage in the X and Y directions while also rotating the theta axis with an equal and opposite angular velocity. FIG. 12A shows the angled beam 1121 aligned with the radius (i.e., a beam angle of 0°) to provide a cut angle corresponding the angle α. FIG. 12B shows the angled beam 1121 offset from the radius (i.e., with a beam angle of σ) to provide a cut angle greater than the angle α. As shown in FIG. 13, the orientation of the circular part may be changed within a range of beam angles (referred to as the include angle) such that the circular part is cut at a range of cut angles, for example, to provide a rounded bevel. FIG. 14 shows a circular part with a straight beveled edge and FIG. 15 shows a circular part with a rounded beveled edge.

Accordingly, laser processing systems and methods, as described herein, are capable of efficiently laser cutting hard dielectric materials at increased speeds in a time-effective and a cost-effective manner while also reducing edge defects. Although the exemplary embodiments describe post-cut processing of a cut part, the methods for beveling and polishing described herein may be used on edges of any part.

While the principles of the invention have been described herein, it is to be understood by those skilled in the art that this description is made only by way of example and not as a limitation as to the scope of the invention. Other embodiments are contemplated within the scope of the present invention in addition to the example embodiments shown and described herein. Modifications and substitutions by one of ordinary skill in the art are considered to be within the scope of the present invention, which is not to be limited except by the following claims.

What is claimed is:

1. A method for laser cutting and post-cut processing a part from a hard dielectric material, the method comprising:
    cutting at least one part from a hard dielectric material using at least a first laser beam having a wavelength in a range of 1060 nm to 1070 nm, wherein the first laser beam is emitted from a continuous wave laser operating in a quasi-continuous wave ("QCW") mode so as to emit consecutive pulses of laser light, the continuous wave laser operated with a duty cycle up to 15% and with a pulse width ranging between 1 microsecond and 600 microseconds; and
    post-cut processing cut edges of the at least one part using at least a second laser beam to bevel and/or polish the cut edges of the at least one part such that edge defects are reduced.

2. The method of claim 1 wherein the second laser beam forms an angle of incidence relative to a surface of the cut part, wherein the angle of incidence is greater than 0°.

3. The method of claim 2 wherein the angle of incidence is in the range of 15° to 45°.

4. The method of claim 1 wherein the second laser beam forms an angle of incidence relative to a surface of the cut part, wherein the angle of incidence is greater than 0°, and wherein post-cut processing cut edges of the at least one part includes moving the cut part with coordinated motion in multiple axes relative to the second laser beam to bevel the cut edges.

5. The method of claim 1 wherein post-cut processing with the second laser beam bevels the cut edge to form one of a flat edge or a rounded edge that is not perpendicular to a surface of the part.

6. The method of claim 1 wherein the second laser beam is emitted from a second laser, wherein the second laser emits laser light at a shorter wavelength and/or a shorter pulse width than the first laser.

7. The method of claim 6 wherein the second laser is an ultrafast laser having a wavelength in the IR range, the green range or the UV range.

8. The method of claim 1 wherein the continuous wave laser operating in QCW mode is a single mode (SM) fiber laser.

9. The method of claim 1 wherein the hard dielectric material is transparent at a wavelength of the first laser beam.

10. The method of claim 1 wherein the hard dielectric material has a bandgap energy exceeding the photon energy of the first laser beam.

11. The method of claim 1 wherein the hard dielectric material is sapphire or toughened glass.

12. A multi-laser system comprising:
a first laser system for cutting at least one part from a hard dielectric material using at least a first laser beam having a wavelength in a range of 1060 nm to 1070 nm, wherein the first laser system includes a continuous wave laser operating in a quasi-continuous wave ("QCW") mode so as to emit consecutive pulses of laser light;
a second laser system for post-cut processing cut edges of the at least one part using at least a second laser beam to bevel and/or polish the cut edges of the at least one part such that edge defects are reduced;
at least one motion stage for supporting the hard dielectric material and the cut part and for moving the hard dielectric material and the cut part relative to the first laser system and the second laser system, respectively; and
a control system configured to control the first laser system, the second laser system and the at least one motion stage, wherein the control system is configured to periodically switch power to the continuous wave laser to pulse the continuous wave laser in the QCW mode with a duty cycle up to 15% and with a pulse width ranging between 1 microsecond and 600 microseconds.

13. The multi-laser system of claim 12 wherein the first laser system further comprises:
a focus lens configured to focus the laser light on the hard dielectric material;
a laser head configured to direct the focused laser light to the hard dielectric material and including a nozzle for delivering an inert gas to the hard dielectric material with the laser light; and
a gas delivery system configured to deliver the inert gas into the laser head.

14. The multi-laser system of claim 12 wherein the continuous wave laser is a single mode (SM) fiber laser.

15. The multi-laser system of claim 12 wherein the second laser system is configured to direct the second laser beam at an angle of incidence relative to a surface of the cut part, wherein the angle of incidence is greater than 0°, and wherein the controller is configured to move the motion stage with coordinated motion in multiple axes relative to the second laser beam to bevel and/or polish the cut edges of the part.

16. The multi-laser system of claim 12 wherein the second laser system includes laser an ultrafast laser having a wavelength in the IR range, the green range or the UV range.

17. The multi-laser system of claim 12 wherein the hard dielectric material is transparent at a wavelength of the first laser beam.

18. The multi-laser system of claim 12 wherein the hard dielectric material is sapphire or toughened glass.

19. A method for laser cutting and post-cut processing a part from a hard dielectric material, the method comprising:
cutting at least one part from a hard dielectric material using at least a first laser beam having a wavelength in a range of 1060 nm to 1070 nm, the hard dielectric material being transparent at a wavelength of the first laser beam and wherein the first laser beam is configured to emit consecutive pulses of laser light having a pulse width in a range of 10 microseconds to 600 microseconds and a peak power density in a range of $1.16 \times 10^8$ W/cm$^2$ to $1.9 \times 10^8$ W/cm$^2$;
post-cut processing cut edges of the at least one part using at least a second laser beam to bevel and/or polish the cut edges of the at least one part such that edge defects are reduced.

20. The method of claim 19 wherein the second laser beam is emitted from a second laser, wherein the second laser emits laser light at a shorter wavelength and/or a shorter pulse width than the first laser.

* * * * *